Figure 1:
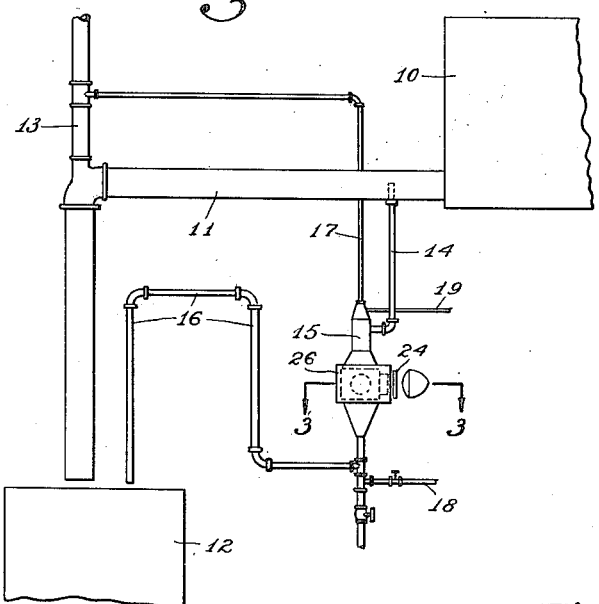

March 19, 1935.  A. L. HOLVEN ET AL  1,994,768

TURBIDITY CONTROL APPARATUS AND SYSTEM

Filed Jan. 19, 1932   2 Sheets-Sheet 1

INVENTORS
ALFRED L. HOLVEN & THOMAS R. GILLETT
BY
ATTORNEY

Patented Mar. 19, 1935

1,994,768

UNITED STATES PATENT OFFICE 1,994,768

TURBIDITY CONTROL APPARATUS AND SYSTEM

Alfred L. Holven and Thomas R. Gillett, Crockett, Calif.

Application January 19, 1932, Serial No. 587,568

11 Claims. (Cl. 250—41.5)

Our present invention relates to a clarity control apparatus and more particularly to a system of control and apparatus for detecting and/or continuously recording the turbidity of a liquid and directing its flow in response to this condition.

An object of our invention is to provide apparatus which will operate in an automatic manner to detect and record the turbidity of a flowing or stationary liquid.

Another object of our invention is to provide a clarity detecting apparatus and control system for a flowing liquid which will automatically direct the liquid into a proper channel as determined by its turbidity.

A further object of our invention is to provide a new and novel photoelectric apparatus for observing and controlling the flow of a liquid in response to changes in its turbidity.

While our invention is broadly applicable to a variety of liquids and uses, for the purpose of this description, we will describe its operation in connection with the control of a sugar liquor filtrate as encountered in the refining of sugar syrups.

In the refining of sugar syrups filters are extensively used for clarifying the liquors in the different steps of the process. When of proper clarity the liquor or filtrate from these filters is passed on to the next succeeding step of the process and when it is not of proper clarity it is returned to be refiltered.

It is the practice to have an operator in attendance at the filter station whose duty is to periodically observe the filtrate and direct it into its proper channel as his experience dictates. This form of determination, to be of any real value must be made quickly and often by persons who are not of the highest discernment or technical ability. Furthermore, in all of the systems heretofore known to us the idiosyncrasy of the individual observer must always be reckoned with as an indeterminate factor in the results of the observation, it being well recognized that the retina of the human eye differs with each individual.

In order to correct this situation and assure that the liquids will be of proper clarity we propose to subject the filtrate to our novel clarity detecting and recording apparatus, as will hereinafter appear.

Briefly, our invention consists in the provision of a photoelectric device which operates in response to the turbidity of a flowing liquid to control a recording milliammeter that will continuously record the turbidity of the liquid. The photoelectric device also operates suitable signal devices to appraise the attendant of any change in the clarity or turbidity of the liquid.

While we shall in describing the preferred embodiment of our invention refer to a photoelectric cell as the light sensitive means, it is to be understood that any type of photoelectric device such as, selenium cell, photoconductive cell, thermopile, etc., may be employed without departing from the spirit or scope of the invention.

Our improvement also contemplates the provision of electro-mechanical means in conjunction with the filter discharge pipe which will automatically direct the filtrate into a proper hopper as determined by its turbidity.

For a better understanding of our invention reference should be had to the accompanying drawings wherein we have shown by way of illustration and not of limitation one type of apparatus for carrying out our invention.

In the drawings wherein like numerals refer to like parts throughout the several views—

Figure 2:
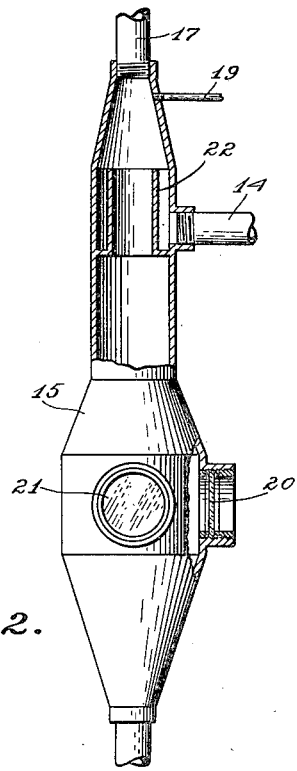
Figure 4:
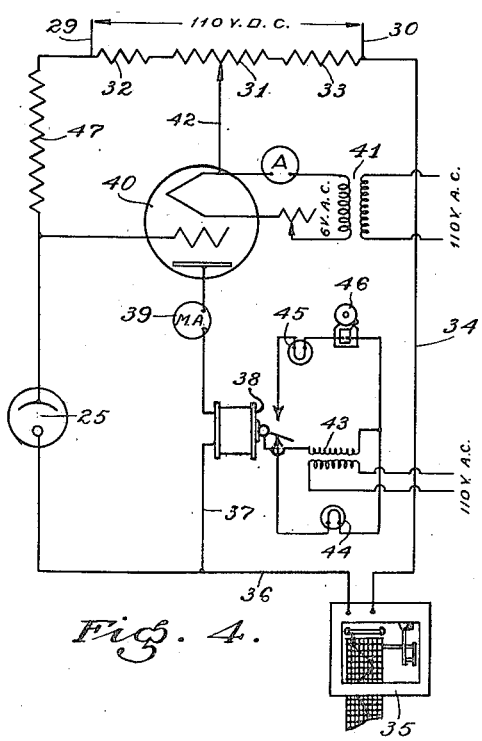
Figure 3:
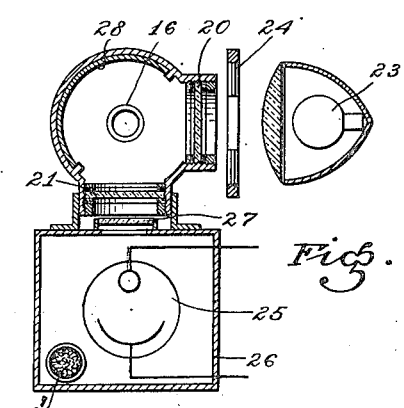
Figure 5:
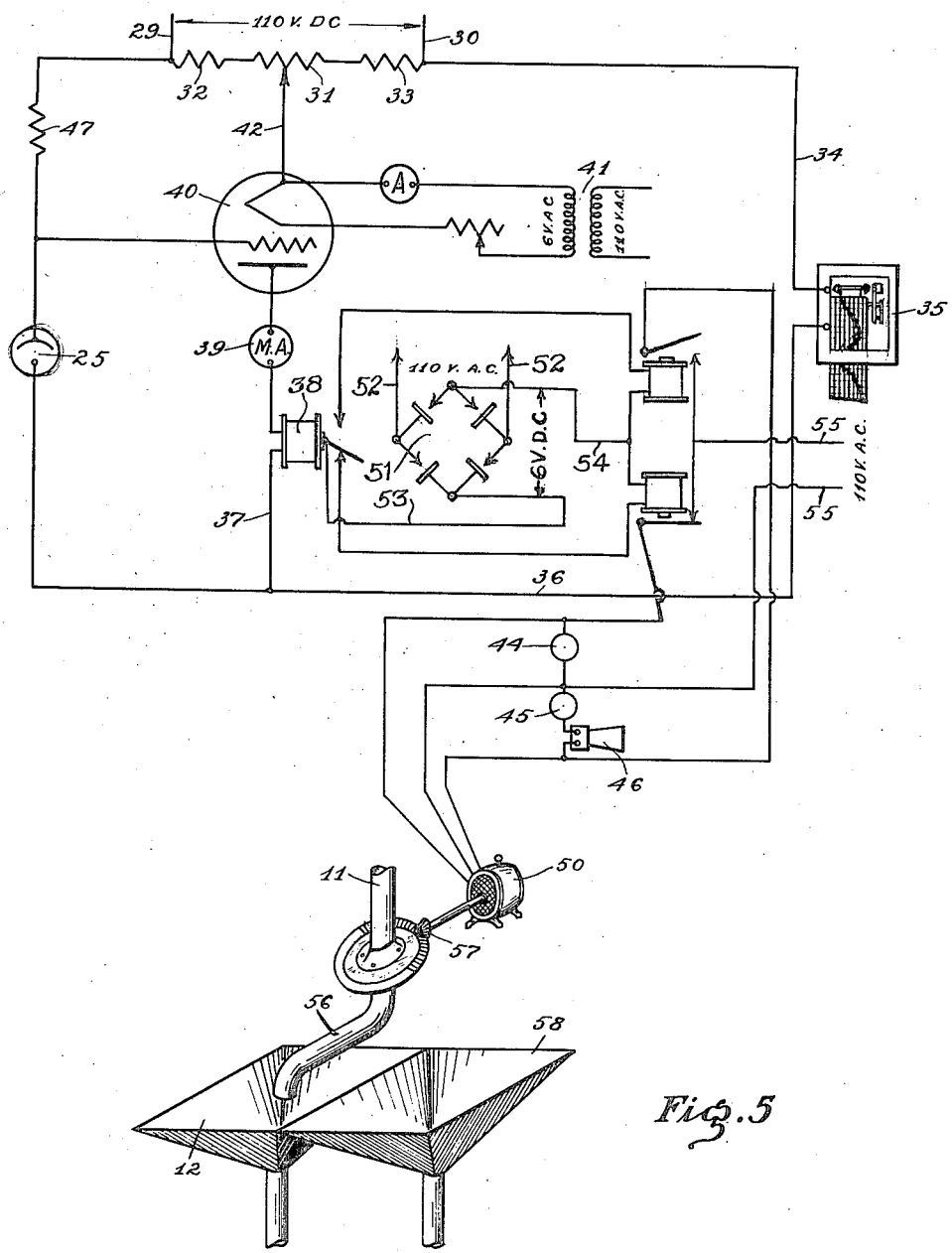

Figure 1 shows the method of attaching our improved photoelectric clarity observing means to the discharge pipe of a Sweetland filter, Figure 2 is a partial sectional view showing a preferred form of observation chamber for our device, Figure 3 is a horizontal sectional view taken along line 3—3 of Figure 1, showing the disposition of the component parts of our photoelectric observing and detecting apparatus, Figure 4 is a schematic wiring diagram showing the general arrangement of apparatus and electrical connections therefor, wherein a graphic recording means and electric signals are employed, and Figure 5 shows the scheme of connections illustrated in Figure 4, modified so as to also automatically control a reversible motor for properly directing the filtrate into suitable hoppers in response to changes in its turbidity.

Before discussing the various mechanical and electrical details of our improved apparatus we should like to make the following observations with respect to the detection of turbidity of a liquid by the use of photoelectric means. It is well known that a photoelectric cell may be operated in response to the amount of light absorbed by a liquid when the liquid is interposed directly between a source of light and the photoelectric device. Under these conditions the insoluble matter in suspension in the liquid will tend to reduce the amount of light projected upon the photoelectric device. This form of detection is comparatively accurate in the cases of sludges, slurries, etc., which contain relatively large amounts of insoluble matter, but it is impracticable where the amount of suspended matter is so small, as is the case with filter liquors of the type with which this invention is concerned, that the turbidity has practically no effect on the amount of light transmitted therethrough.

The most accurate method for detecting small amounts of turbidity such as is encountered in liquids is by the reflection of light from the particles responsible for the turbidity. We have found that with the cloudiness such as is encountered in sugar liquids the amount of light reflected varies substantially proportionally with the amount of turbidity and therefore when our photoelectric device is operated upon this principle it serves as an index of the amount of suspended matter present.

In Figure 1 of the drawings we have shown a preferred sampling arrangement by means of which we are able to continuously subject a portion of the filtrate to observation and control in accordance with our invention.

In this figure of the drawings 10 designates a suitable filter having a discharge pipe 11 which serves to direct the filtrate from the filter 10 to a proper hopper 12. The discharge pipe 11 is provided with an air vent 13. Connected with the filtrate discharge pipe 11 by means of a sampling tube 14 we show an observation chamber 15 which will be described in more detail hereinafter. The sampling tube 14 is of such proportions that it will direct about one gallon of liquid through the chamber 15 every minute. Leading from the observation chamber 15 there is provided a suitable discharge pipe 16 so that the sample liquor may flow continuously therethrough. The sampling chamber 15 is also provided with an air vent 17 which connects with the vent pipe 13. A flush line pipe 18 connects with the discharge end of the chamber 15 to facilitate cleaning. An overflow pipe 19 is provided at the upper end thereof.

By referring to Figure 2, it will be seen that the observation chamber 15 comprises an elongated cylindrical member of varying diameters, in the largest diameter of which there is provided at right angles to each other two transparent windows 20 and 21. It will be also noted that the chamber 15 is provided with an internal annular baffle 22 at the point where the filtrate collected by the pipe 14 enters. The purpose of this baffle is to remove and prevent the formation of air bubbles in the chamber 15. This is an important feature as the tiniest air bubbles will reflect light in very much the same manner as will suspended matter in the liquid. In order that the liquid will flow evenly through the chamber we provide it with a smooth and substantially stream lined interior. With the proper proportions and a suitable rate of flow of liquid deaeration is easily accomplished by the arrangement shown.

As illustrated in Figure 3 of the drawings we dispose a suitable source of light adjacent the window 20. In the preferred embodiment this source of light comprises a 32 candle power spot light 23 having a reflector and condensing lens. In order to control the amount of light projected into the chamber 15 we may interpose an adjustable shutter 24 between the light 23 and the window 20. Adjacent the window 21 we show a photoelectric device 25 which in the preferred embodiment may be a standard photoelectric cell. The light sensitive device 25 is housed in a light excluding cabinet 26 and interposed between the window 20 and the cell there is provided a suitable light filter 27. To prevent the reflection of light from the walls of the observation chamber 15 we cover the interior of the chamber opposite the windows 20 and 21 with a light absorbing black screen or sheet 28.

With the arrangement described, it will be understood that when the filtrate is flowing through the observation chamber 15 and a light is projected thereupon from the source 23, there will be reflected into the photoelectric cell 25 an amount of light either corresponding to or proportional to the turbidity of the liquid. In order that a control can be effected in response to the intensity of light reflected upon the cell 25 we propose to connect the cell 25 with a suitable source of current and amplifier to control indicating and recording apparatus, as illustrated in Figure 4 of the drawings.

In this latter figure of the drawings the numerals 29 and 30 designate the incoming wires of a source of direct current power at 110 volts potential. Connected across this source of power we show a 400 ohm potentiometer 31 having fixed resistances 32 and 33 of 250 ohms and 350 ohms respectively at each end. The conductor 30 is also connected by means of a wire 34 with a recording milliammeter 35. The other side of the milliammeter is connected by means of wires 36 and 37 through a relay 38 and a milliammeter 39 with the plate of a tube amplifier 40. The filament of the tube 40 is shown as energized through a transformer 41 from a source of alternating current and is connected to the potentiometer 31 at an intermediate point thereof by means of a conductor 42.

The circuits so far described cover the connections of the various instruments employed in our present system to accomplish the recording aspect. The signaling aspect of our system comprises a source of A. C. power which is connected through a transformer 43 with the relay 38. The relay 38 is of a two position type which will at one value of current connect the transformer 43 with a green light 44 and when the current is of a higher value connect a red light 45 and a bell or other sound reproducing device 46 with the transformer 43.

In order to effect a control of the above described circuits in accordance with our invention we connect the grid of the tube 40 through a comparatively high grid resistance 47 with the power conductor 29 and also connect the photoelectric cell 25 between the grid and plate of the tube 40. With this type of grid connection a very sensitive control can be effected when the grid resistor 47 has a resistance in the neighborhood of 200 megohms.

It is appreciated that in order to maintain such a high resistance grid leak effective and the system uniformly operative, it will be necessary to eliminate all possible sources of current leakage due to moisture, grounds, etc. We therefore propose to maintain a suitable dehydrating agency 26' such as calcium chloride in the amplifier case and photoelectric cell housing 26.

With the scheme of connections as shown in Figure 4, it will be understood that when light strikes the photoelectric cell the photoelectric current produced thereby will act upon the grid of the tube 40 and lower its filament to plate resistance. This decrease in resistance in the tube 40 will cause more current to flow in the plate circuit and as the relay 38 which is adjusted to maintain one position below a predetermined current value responds to this change in the plate current it will control the connections of the red light 45 and the bell 46 so as to give a visual or audible alarm in response to the control effected by the photoelectric cell 25. In other words, when conditions have been adjusted so that the cell 25 is exposed to no reflected light, as when the liquid is clear, the relay 38 will remain inactive and the green light 44 will be energized, but when reflected light strikes the cell 25 the red light and bell will be set in operation. With the above type of control when the indicating and alarm devices are energized the attendant's attention will be called to the particular filtrate under control and he will then either shut off the flow or direct it to a proper channel by the operation of suitable valves.

As a further improvement in our system of control we may, as shown in Figure 5 of the drawings, also provide for the automatic control of the filtrate in response to the relay 38. This can be accomplished by substituting suitable relays 48 and 49 for the red and green lights 45 and 44 and controlling a suitable electro-mechanical fluid conduit changing means by these latter relays. In this figure of the drawings we show a reversible electric motor 50 which is adapted to rotate in one direction when the relay 48 is energized and in a reverse direction when the relay 49 is energized. As a source of power for the relays 48 and 49 we show a rectifier 51 which operates from a 110 volt A. C. source 52 to supply a low voltage to the conductors 53 and 54.

The motor 50 is of the alternating current type and is energized from a 110 volt A. C. source designated by the numeral 55. The green and red lights 44 and 45 and the sound producing device 46 are shown here as connected across the conductors which control the motor 50.

The operation of this latter arrangement will be understood from the description of the system illustrated in Figure 4. It should only be necessary to add here that when the relay 38 operates in response to the photoelectric cell 25 the relays 48 and 49 will be energized and the motor 50 will be controlled so as to swing a movable spout 56 with which it is connected by gears 57 and thus direct the filtrate into a cloudy filtrate receptacle (hopper 12) or into a hopper 58 depending upon the turbidity of the filtrate.

In addition to providing a means for operating the signaling devices and controlling the discharge of the filtrate, our system also provides a means for continuously recording the condition of the liquid under control. This aspect of our invention is accomplished, as previously suggested, by the recording milliammeter 35. This meter is of standard construction and has a timed and continuously moving record sheet over which a stylus, responsive to the current passing through the meter, moves to graphically record the same. Since the current flowing through this meter will vary when the photoelectric device 25 causes a change in the resistance of the tube 40, it will be seen that the changes in current recorded by the meter 35 will indicate the time and period of any abnormal condition of the filtrate.

While we have, for the sake of clearness and in order to disclose our invention so that the same can be readily understood, described and illustrated specific devices and arrangements, we desire to have it understood that this invention is not limited to the specific means disclosed but may be embodied in other ways that will suggest themselves, in view of this broad disclosure, to persons skilled in the art, and while the present apparatus is designed primarily for liquids, it will be understood that obvious modifications would make it adaptable to either gases or solids. It is believed that this invention is broadly new and it is desired to claim it as such so that all such changes as come within the scope of the appended claims are to be considered as part of this invention.

Having thus described our invention, what we claim and desire to secure by Letters Patent is—

1. In apparatus for indicating the turbidity of a flowing liquid, the combination of a chamber through which the liquid may pass, means to permit a beam of light to be projected into and reflected from the liquid in said chamber, a source of light adjacent said means for projecting a beam of light into the flowing liquid, a photoelectric cell adjacent said beam of light adapted to be influenced by the light reflected from insoluble particles in the liquid as they pass through said beam of light, and a light absorbing screen member disposed within said chamber opposite said source of light for absorbing all light rays not reflected upon said photoelectric cell by the insoluble particles in the liquid.

2. In apparatus for operating devices in response to the turbidity of a flowing liquid, the combination of a chamber having a streamline interior through which a liquid may flow, means for projecting a beam of light into the liquid flowing through said chamber, a photoelectric cell disposed at one side of said beam of light adapted to be influenced by light reflected from solid particles in the liquid as they pass through said beam of light, a light absorbing screen disposed within said chamber opposite said beam of light for absorbing all light rays not reflected upon said photoelectric cell by the solid particles in said liquid, and means controlled by said photoelectric cell for indicating the changes in turbidity of said flowing liquid.

3. In apparatus for indicating the turbidity of a flowing liquid, the combination of a chamber through which the liquid may pass having two transparent apertures disposed at right angles to each other in the walls thereof, a source of radiant energy adjacent one of said apertures for projecting a beam of light into the flowing liquid, a photoelectric cell adjacent the other of said apertures adapted to be influenced by the light reflected from particles in suspension in said flowing liquid, a liquid conduit for continuously introducing a liquid into the top of said chamber, and a deaerating means disposed at the discharge end of said liquid conduit for removing all air bubbles from the liquid before it is exposed to the beam of light from said source of radiant energy.

4. In apparatus for operating a device in response to the turbidity of a flowing liquid, the combination of a chamber through which the flowing liquid may pass, means for projecting a beam of light into the flowing liquid, a photoelectric cell disposed at one side of said beam of light adapted to produce a current in proportion to the intensity of light reflected by solid particles in the liquid exposed to said beam of light, a light absorbing screen within said chamber for absorbing all light rays not reflected by the solid particles carried through the beam of light by the flowing liquid, and means operating in response to the changes in turbidity of said liquid as determined by said photoelectric cell to indicate the changes of turbidity in the flowing liquid.

5. In a system for controlling the flow of a liquid in response to its condition of turbidity, the combination of means for projecting a beam of light into the flowing liquid and causing it to be reflected upon a photoelectric device, a photoelectric device, means for directing any bubbles entrained in said flowing liquid away from the field of said photoelectric device, a source of current having a relay adapted to be controlled by said photoelectric device, a movable discharge pipe for said liquid, a plurality of receptacles beneath said discharge pipe, electro-mechanical means for moving said discharge pipe with respect to said receptacles, a source of power for said electro-mechanical means, and circuit controlling means responsive to said relay for controlling said electro-mechanical means to move said discharge pipe over the receptacles in accordance with the turbidity of the liquid as determined by said photoelectric device.

6. In a system for controlling the flow of a liquid in response to its condition of turbidity, the combination of means for projecting a beam of light into the flowing liquid and causing it to be reflected upon a photoelectric device, means for deaerating said flowing liquid before it passes through said beam of light, a photoelectric device, a source of current having a relay adapted to be controlled by said photoelectric device, a movable discharge pipe for said liquid, electro-mechanical means for moving said discharge pipe, a source of power for said electro-mechanical means, and circuit controlling means responsive to said relay for controlling said electro-mechanical means to move said discharge pipe in response to changes in the turbidity of the liquid as determined by said photoelectric device.

7. In apparatus for indicating and recording the turbidity of a flowing liquid, the combination of a chamber through which the liquid may pass, means for deaerating the liquid prior to passing through the chamber, means to permit a beam of radiant energy to be projected into and reflected from the insoluble particles in the liquid, a source of radiant energy adjacent to said means for projecting a beam of light into the flowing liquid, and a light sensitive device adjacent said beam of light adapted to be influenced by the light reflected from insoluble particles in the liquid.

8. In apparatus for recording and/or indicating the turbidity of a flowing liquid, the combination of a flow chamber for a liquid having an enlarged lower portion and an upper portion of smaller dimensions, said portions being connected by an intermediate tapering portion, means for directing a sample of the flowing liquid into the smaller portion of said chamber, means associated with the enlarged portion of said chamber adapted to permit radiant energy to be projected into and reflected from the liquid in said chamber, and means within the smaller portion of said chamber cooperating with said sample directing means for deaerating the liquid flowing into said chamber.

9. In apparatus for detecting variations in the turbidity of a flowing liquid, the combination of a chamber through which a flowing liquid may pass, means for projecting a beam of radiant energy into the liquid flowing through said chamber, photoelectric means responsive to changes produced upon said beam of radiant energy by solid particles in suspension in said flowing liquid, a conduit connected to said chamber forming a fluid inlet to said chamber, and means within said chamber adjacent said conduit for deaerating the fluid introduced into said chamber through said conduit.

10. In apparatus for detecting variations in the turbidity of a flowing liquid, the combination of a chamber through which a flowing liquid may pass in a continuous manner, means for projecting a beam of radiant energy into the liquid flowing through said chamber, photoelectric means responsive to changes produced upon said beam of radiant energy by solid particles in suspension in said flowing liquid, a vent at the top of the chamber through which air may escape, a fluid inlet conduit connected to said chamber above said photoelectric means and below said vent, and means within said chamber adjacent said fluid inlet conduit for directing all entrained air entering said chamber out through said vent.

11. In apparatus for controlling the operation of a filter in response to the turbidity of the filtrate issuing therefrom, the combination of a filter having a discharge outlet for the filtrate, a sample chamber through which a sample of the filtrate may flow in a continuous manner, a sampling conduit connected between the discharge outlet of the filter and said sample chamber, photoelectric means associated with said sample chamber responsive to the turbidity of the liquid flowing through said sample chamber for indicating the condition thereof, and means cooperating with said sampling conduit for deaerating the sample of filtrate collected thereby before it passes into said sample chamber.

ALFRED L. HOLVEN.
THOMAS R. GILLETT.